United States Patent [19]

Martinez

[11] Patent Number: 5,555,821
[45] Date of Patent: Sep. 17, 1996

[54] APPARATUS AND PROCESS FOR REMOVING UNBURNED CARBON IN FLY ASH

[76] Inventor: Morris P. Martinez, 1705 E. 39th Ave., Denver, Colo. 80205

[21] Appl. No.: 348,463

[22] Filed: Dec. 2, 1994

[51] Int. Cl.$^6$ ...................................................... F23N 5/22
[52] U.S. Cl. .......................................... 110/191; 110/225
[58] Field of Search ................................. 110/191, 255, 110/235

[56] References Cited

U.S. PATENT DOCUMENTS

| | | | |
|---|---|---|---|
| 3,328,180 | 6/1967 | Ban . | |
| 3,374,101 | 3/1968 | Ban et al. . | |
| 3,719,171 | 3/1973 | Brooks | 110/255 |
| 3,728,977 | 4/1973 | Brannan | 110/191 |
| 4,009,667 | 3/1977 | Tyer et al. | 110/255 |
| 4,961,391 | 10/1990 | Mak et al. | 110/246 |
| 5,270,017 | 12/1993 | Schwartz, Jr. | 110/246 |
| 5,410,973 | 5/1995 | Kunatler et al. | 110/246 |
| 5,411,714 | 5/1995 | Wu et al. | 110/225 |

*Primary Examiner*—John T. Kwon
*Attorney, Agent, or Firm*—Edwin H. Crabtree; Donald W. Margolis; Ramon L. Pizarro

[57] ABSTRACT

An apparatus and process for removing unburned carbon in fly ash. The apparatus includes a stainless steel heating chamber heated in a range from 800 to 1200 degrees F. The fly ash is introduced at one end of the heating chamber and moved slowly to an opposite end by a screw auger. The auger mixes the fly ash with oxygen. The oxygen is introduced at spaced apart heating areas along the length of the heating chamber. The oxygen accelerates the heating and burning of the unwanted carbon in the fly ash. The amount of oxygen introduced into the heating chamber is under computer control to regulate the temperature in the heating chamber and the heating of the fly ash. In the burning of the unwanted carbon in the fly ash, the carbon acts as a fuel in combination with the oxygen for heating the fly ash and removing the carbon from the fly ash. The heating chamber is also used to preheat untreated fly ash received through a preheating chamber before it is introduced into the heating chamber. The preheating chamber is mounted inside the heating chamber. Also, the treated fly ash when exiting the heating chamber can be used as a heat transfer agent in preheating the untreated fly ash prior to introduction to the heating chamber. By reducing the carbon content in the treated fly ash to less than 0.7%, the fly ash can be used as a mineral admixture in concrete.

14 Claims, 4 Drawing Sheets

FIG. 1

APPARATUS AND PROCESS FOR REMOVING UNBURNED CARBON IN FLY ASH

BACKGROUND OF THE INVENTION (a) Field of the Invention

This invention relates to treating of unwanted and unburned carbon in fly ash and more particularly, but not by way of limitation, to an apparatus and process for removing the carbon by heating the fly ash up to 1200 degrees F. in a heating chamber.

(b) Discussion of Prior Art

Heretofore there have been a variety of different types of methods and apparatus used in treating fly ash. U.S. Pat. No. 5,160,539 to Cochran, discloses a method and product of fly ash benefication wherein fly ash with carbon is oxidized in a bubbling fluid bed of the same material and mixed with air at temperatures in a range of 1300 to 1800 degrees F. U.S. Pat. No. 5,207,164 to Breen et al. describes a process for limiting the production, of fly ash in the bottom of a boiler. The fly ash is carried in a gas stream where it is exposed to a flame heat prior to being dropped into an ash pit.

U.S. Pat. Nos. 3,374,101 and 3,328,180 to Ban describes two different methods of treating fly ash to remove the carbon therein. One method treats fly ash pellets to progressive heat exposure and the other method treats the fly ash by forming discrete green pellets and then drying and firing pellets at temperatures up to 2400 degrees F. U.S. Pat. No. 4,705,409 to Trerice discloses a method and apparatus for reducing and measuring carbon content in fly ash. The invention as described in this patent employs microwave energy as a method of heating the fly ash.

None of the above mentioned patents describe the use of a stainless steel heating chamber heated in a range of from 800 to 1200 degrees F. wherein fly ash is introduced at one end of the heating chamber and moved slowly to an opposite end by an auger. The auger is used to mix the fly ash with oxygen. When the carbon in the fly ash is burned in the heating chamber the carbon acts as a fuel in combination with the oxygen for heating the fly ash and removing the unwanted carbon in the fly ash.

SUMMARY OF THE INVENTION

In view of the foregoing, it is a primary object of the present invention to provide treated fly ash which is acceptable as a mineral admixture in concrete and thus a saleable product to cement concrete companies.

Another object of the invention is to provide an economical means for treating fly ash having unburned and unwanted carbon which heretofore was a waste product and was buried at a local landfill or waste dump at great cost to power companies and utilites burning anthracite and bituminous coal. The invention reduces the need of burying fly ash at a landfill.

Another object of the invention is to provide power companies, utility companies and any other industry burning coal with fly ash as a by-product an apparatus that can be easy installed next to the coal burning facility. The fly ash can be treated on location without having to transport untreated fly ash off site for further processing. The invention can be used for treating both anthracite and bituminous coal having different percentages of unburned carbon left in the fly ash. The apparatus can be operated efficiently and economically using an oxygen generator plant on site for heating the heating chamber along with taking advantage of the using the unwanted carbon left in the fly ash as a fuel in combination with the oxygen in heating the fly ash and removing the unwanted carbon.

The apparatus for treating fly ash includes a stainless steel heating chamber heated a range from 800 to 1200 degrees F. The fly ash is introduced at one end of the heating chamber and moved slowly to an opposite end by a screw auger. The auger mixes the fly ash with oxygen. The oxygen is introduced at spaced apart heating areas along the length of the heating chamber. The oxygen accelerates the heating and burning of the unwanted carbon in the fly ash. The amount of oxygen introduced into the heating chamber is under computer control to regulate the temperature in the heating chamber and the heating of the fly ash. In the burning of the unwanted carbon in the fly ash, the carbon acts as a fuel in combination with the oxygen for heating the fly ash and removing the carbon from the fly ash. The heating chamber is also used to preheat untreated fly ash received through a preheating chamber before it is introduced into the heating chamber. The preheating chamber is mounted inside to the heating chamber. Also, the treated fly ash when exiting the heating chamber can be used as a heat transfer agent in preheating the untreated fly ash prior to introduction to the preheating chamber.

These and other objects of the present invention will become apparent to those familiar with containers used as play objects and the like from the following detailed description, showing novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PREFERRED EMBODIMENTS

Figure 1:
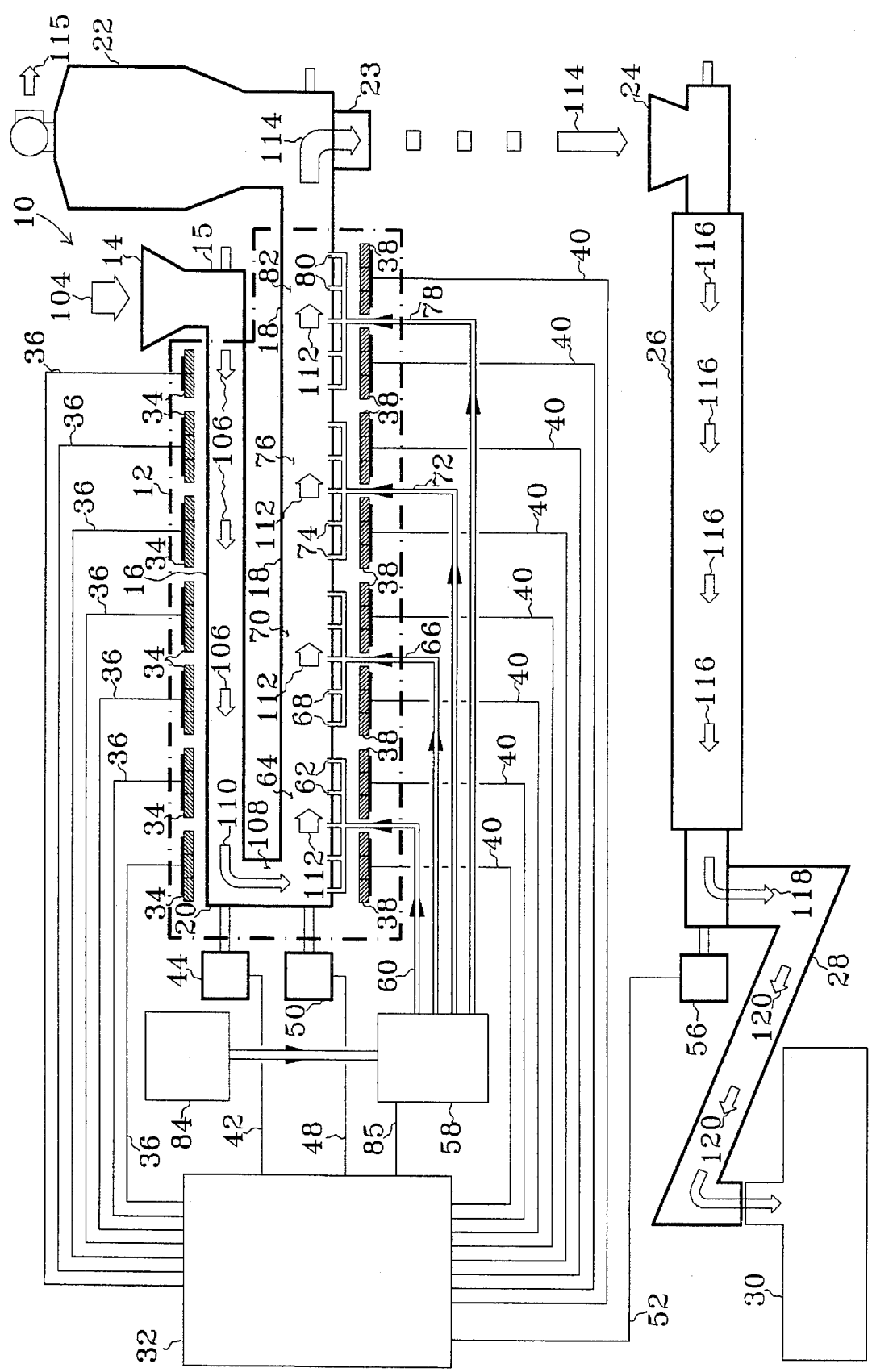
FIG. 1 is a schematic drawing of the process using the subject apparatus in removing unwanted carbon from fly ash.

In FIG. 1, a schematic of the subject apparatus and process is disclosed. The apparatus is identified by general reference numeral 10 and includes broadly a housing 12 having a pair of fly ash receiving hoppers 14 for receiving untreated fly ash mounted above a first end 15 of the housing 12. The apparatus 10 also includes a pair of preheating chambers 16 and a pair of heating chambers 18 disposed below and communicating at a second end 20 in the housing 12 with the preheating chambers 16. A bag house dust collector 22 is mounted at a discharge end 23 of the housing 12 to collect gases and reduce dust turbulence. A cooling chamber 26, with a water jacketed screw auger therein, receives the treated fly ash from the discharge hopper 24 and moves and cools the treated fly ash to a transfer conveyer 28. The transfer conveyer 28 transfers the fly ash into a storage unit 30 or conveyance vessel.

In this view the two receiving hoppers 14, the two preheating chambers 16, the two heating chambers 18 and the two discharge hoppers 24 are not shown since they are disposed behind each other. The two preheating chambers 16 and the two heating chambers 18 can be seen side by side in sectional view FIG. 5.

A computer control unit and power supply 32 is connected to heating elements 34 via lead lines 36 mounted along the top and length of the housing 12 and adjacent the preheating chambers 16. The heating elements 34 are used for preheating the apparatus 10 prior to the treating of the fly ash. Also, the computer control unit and power supply 32 is connected to heating elements 38 via lead lines 40 mounted along the bottom and length of the housing 12 and adjacent the heating chambers 18. The heating elements 38 are also used for preheating the apparatus 10. It should be noted that after the initial preheating of the chambers 16 and 18, it is no longer necessary to use the heating elements 34 and 36 since the treating of fly ash with oxygen provides sufficient heat in removing the unwanted carbon.

Figure 6:
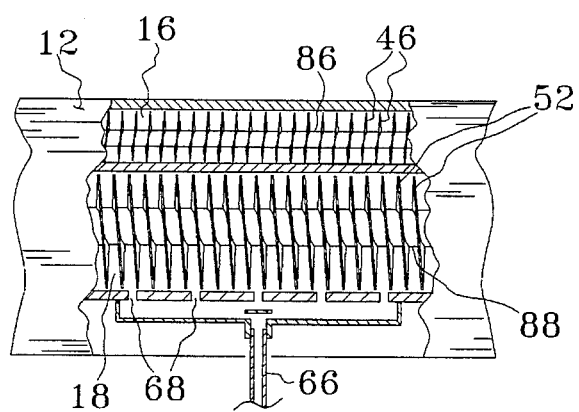
FIG. 6 is an enlarged sectional view from a side of the apparatus shown in FIG. 2 and surrounded by dotted lines with an arrow marked 6.
Figures 4, 5:
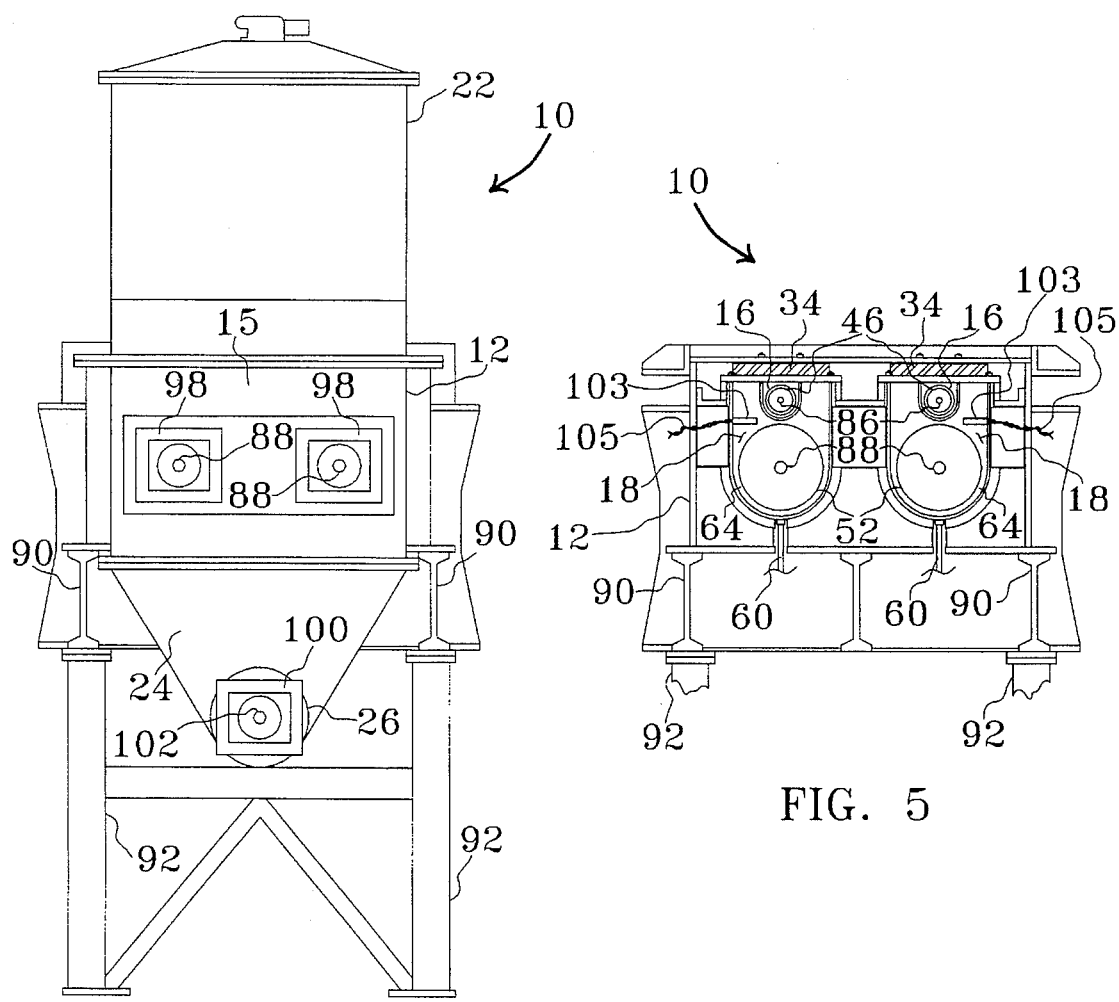
FIG. 4 is an end view of the apparatus.
FIG. 5 is a cross section of the apparatus taken along lines 5—5 as shown in FIG. 2.

The computer control unit and power supply 32 is connected via lead line 42 to a pair of preheating chamber drive motors 44 disposed behind each other. The preheating chamber drive motors 44 are used to drive a pair of screw augers 46 inside the preheating chamber 16. The screw augers 46 are shown in FIGS. 5 and 6. Also, the computer control unit and power supply 32 is connected via lead lines 48 to a pair of heating chamber drive motors 50 disposed behind each other. The heating chamber drive motors 48 are used to drive a pair of screw augers 52 inside the heating chamber 16. The screw augers 52 are also shown in FIGS. 5 and 6. Further, the computer control unit and power supply 32 is connected via lead line 52 to a cooling chamber drive motor 56. The cooling chamber drive motor 56 is used to drive a screw auger inside the cooling chamber 26. The screw auger inside the cooling chamber 26 is water jacket cooled for lowering the temperature of the treated fly ash from a temperature range of 800 degrees F. to 200 degrees F. and below. The water jacket cooled screw auger is not shown in the drawings.

The apparatus 10 also includes an oxygen computer control unit and valves 58 connected to via first conduit 60 to a first oxygen manifold 62 communicating with first stage heating area 64 inside the heating chamber 18. The control unit and valves 58 also includes a second conduit 66 connected to a second oxygen manifold 68 communicating with a second stage heating area 70, a third conduit 72 connected to a third oxygen manifold 74 communicating with a third stage heating area 76 and a fourth conduit 78 connected to a fourth oxygen manifold 80 communicating with a fourth stage heating area 82 inside the heating chamber 18. The apparatus 10 may also include an oxygen generator plant 84 connected to the oxygen control unit and valves 58 for generating oxygen on the plant site and for reducing the cost of supplying oxygen from an outside source. The oxygen control unit and valves 58 is connected to and under the control of the computer control unit and power supply 32 via lead 85.

Figure 2:
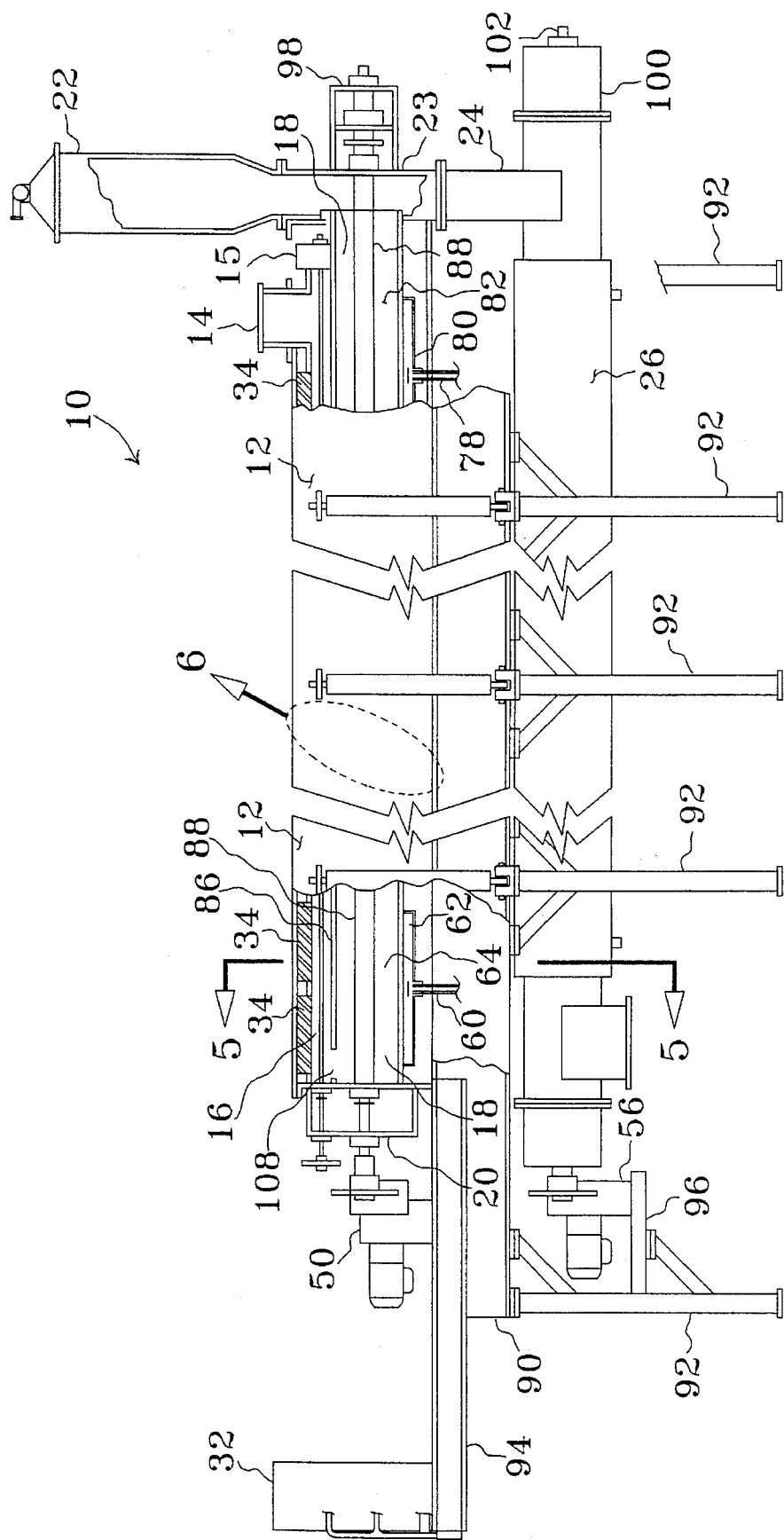
FIG. 2 is a side view of the apparatus for treating fly ash. A portion of the apparatus has been cut away due to the length of the heating chamber.
Figure 3:
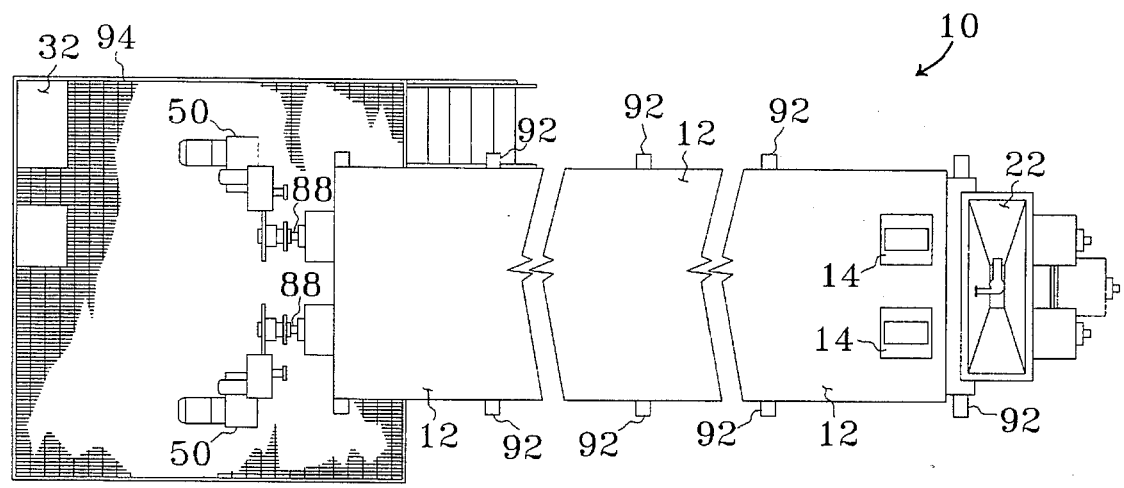
FIG. 3 is a top view of the apparatus shown in FIG. 2 and illustrating twin preheat auger drive motors, a stand around one end of the apparatus and the top of two fly ash receiving hoppers used for receiving the untreated fly ash prior to preheating the fly ash.

In FIG. 2 a side view of the apparatus 10 is shown with a portion of the housing 12 cut away to expose the preheating chamber 16, first stage heating area 64 of the heating chamber 18 and the fourth stage heating area 82 of the heating chamber 18. In this view, a drive shaft 86 for the preheating chamber screw auger 46 is shown and a drive shaft 88 for the heating chamber screw auger 52 is shown. Also, the housing 12 is shown supported on a rigid housing frame 90 having support legs 92.

Also shown in this drawing and mounted at the second end 20 of the housing 12 is a stand 94 supported on the frame 90. The stand 94 is used for servicing the apparatus 10 and supporting heating chamber drive motors 50 and the computer control unit and power supply 32. The preheating chamber drive motors 44 are not shown in FIG. 2. Disposed below the stand 94 is the cooling chamber drive motor 56 mounted on a motor support 96 attached to one of the support legs 92. The transfer conveyor 28 and the storage unit 30 are not shown in this drawing.

In FIG. 4 an end view of the first end 15 of the apparatus 10 as shown in FIG. 2. In this view, bearing housings 98 can be seen extending outwardly from the housing, 12 for supporting one end of the drive shafts 88. Also, extending downwardly from the bottom of the dust collector 22 is the discharge hopper 24 for discharging the treated fly ash into the cooling chamber 26. Extending outwardly from the end of the cooling chamber 26 is a bearing housing 100 for supporting one end of a drive shaft 102 used for driving a screw auger inside the cooling chamber 26.

FIG. 5 illustrates a cross section of the apparatus 10 taken along lines 5—5 shown in FIG. 2. In this view the two screw augers 46 can be seen received in the two preheating chambers 16. Disposed above the preheating chambers 16 are the heating elements 34 used for preheating the apparatus up to a range of 1000 degrees F. Below the preheating chambers 16 are the two stainless steel heating chambers 18 having the two screw augers 52 therein. Also, seen in this view are the first conduits 60 for supplying oxygen into the first stage heating area 64 of the two heating chambers 18.

FIG. 6 is a cut away view of a portion of the housing 12 of the apparatus as shown in FIG. 2. This view shows one of the screw augurs 46 received inside the preheating chamber 16 and one of the screw augurs 52 disposed below and inside the heating chamber Also shown in the bottom of the heating chamber 18 is the second manifold 68 communicating with the second conduit 66 for introducing oxygen into the heating chamber 16 and heating the untreated fly ash as it is conveyed inside the heating chamber 18.

In operation, the process of treating fly ash with unwanted carbon using the apparatus 10 as described above is accomplished as follows and referring now to both FIGS. 1 and 2. The fly ash is received from the power plant having various percentages of unburned carbon therein. The untreated fly ash is introduced into the apparatus 10 via the fly ash receiving hoppers 14 as indicated by arrow 104. While the apparatus 10 has been described as having a pair of preheating chambers 16 and heating chambers 18, it can be appreciated that a single preheating chamber 16 and heating chamber 18 can be used with departing from the spirit and scope of the invention. Prior to receiving the fly ash in the hoppers 14, the apparatus 10 is preheated using the heating elements 34 and 38 up to a range of 1000 degrees F.

From the hoppers 14, the fly ash is conveyed using the screw augers 46 from right to left, as indicated by arrows 106, until the fly ash reaches the second end 20 of the housing 12. At this point the fly ash has now been preheated in a range of 800 degrees F. The untreated fly ash now drops through an opening 108 between the preheating chambers 16 and the heating chambers 18 as indicated by arrow 110.

When the untreated and preheated fly ash is received in the heating chambers 18, it is now slowly moved using the screw augers 52 from left to right as indicated by arrows 112. Depending on the size of the heating chambers 18 and the size of the screw augers 52 along with the volume of untreated fly ash, the screw augers 52 will rotate from 1 to 20 rpm or may vary in a time of 30 minutes to 90 minutes in the heating, chambers 18. As the fly ash moves from left to right through the first stage heating area 64 and with the introduction of oxygen through the first manifold 62, the fly ash is heated from 800 degrees F. up to a range of 1000 degrees F. During this time the carbon in the fly ash begins to ignite and in combination with the oxygen the temperature of the fly ash continues to raise as it enters the second stage heating area 70.

In the second stage heating area 70 the fly ash is heated up to range of from 1150 to 1160 degrees and below 1200 degrees F. The temperature is controlled by the computer control unit and power supply 32 which regulates the amount of oxygen flowing through the second manifold 68. It has been found that if the fly ash is heated above 1200 degrees F., unwanted melting and charring of the fly ash will begin. Therefore, as the majority of the unwanted carbon in the fly ash burns in combination with the oxygen, the control of the temperature in the second stage heating area 70 is critical.

As the fly ash moves into the third stage heating area 76, the oxygen supply through the third manifold 74 is reduced as the remaining carbon in the fly ash continues to burn in combination with the oxygen. The temperature, still under the control of the computer control unit and power supply 32 by regulating the amount of oxygen, now begins to drop into a range of 1000 degrees F. At this point, the majority of the carbon in the fly ash as been burned. From the third stage heating area 76 the fly ash moves into the fourth stage heating area 82 where the temperature continues to drop into a range of 900 degrees F. By regulating the oxygen in the fourth stage heating area 82, the fly ash begins to cool and the oxygen continues to burn with any remaining carbon left in the fly ash.

As the treated fly ash, having in a range of less than 0.7% carbon, exits the fourth stage heating area 82 as indicated by arrows 114, any dust and fumes received from the heating chamber 18 are received inside the bag house and dust container 22. The dust and fumes are treated inside the container 22 prior to exiting the container as indicated by arrow 116. The treated fly ash is now received through the discharge hopper 24 and into the cooling chamber 26. The cooling chamber 26, with a water jacket cooled screw auger moves the fly ash from right to left as indicated by arrows 116 while cooling the fly ash from 900 degrees F to 200 degrees F and below. At the left end of the cooling chamber 26, the cooled treated fly ash is dropped as indicated by arrow into one end of the transfer conveyer 28. The transfer conveyer 28 moves the fly ash upwardly as indicated by arrows 120 until it reaches the opposite end of the transfer conveyer 28. The treated fly ash is then received inside the storage unit 30 as indicated by arrow 122. The storage unit 30 can be used for holding the treated fly ash for a certain period of time or used for transporting the fly ash to a cement supplier where the treated fly ash is used as a mineral admixture in concrete.

While the above drawings do not illustrate the use of the treated fly ash as a heat transfer source for preheating untreated fly ash, the treated fly ash when exiting the heating chambers 18 can be circulated through a separate preheating chamber for heating untreated fly ash. Obviously, the use of the treated fly ash as a heat transfer agent can easily be incorporated into the invention with the benefits of reducing the operating expense and improving the efficiency of the apparatus 10.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. An apparatus for removing unburned carbon in fly ash, the apparatus comprising:

a heating chamber for receiving the fly ash therein and for heating the fly ash in a range from 800 to 1200 degrees F.;

means for conveying the fly ash along a length of said heating chamber;

an oxygen supply connected to said heating chamber for providing oxygen to said heating chamber, the oxygen heating the fly ash and igniting the unburned carbon in the fly ash, the burning of the carbon acting as a fuel in combination with the oxygen for heating the fly ash and removing the remaining unburned carbon from the fly ash; and means connected to said oxygen supply for regulating the amount of oxygen to said heating chamber and for regulating the temperature inside said heating chamber in a range of 800 to 1200 degrees F.

2. The apparatus as described in claim 1 wherein said means connected to said fuel source for regulating the amount of said fuel to said heating chamber for regulating the temperature inside said heating chamber is computer control means for regulating the temperature in said heating chamber and the heating of the fly ash.

3. The apparatus as described in claim 1 further including a preheating chamber connected to said heating chamber for preheating untreated fly ash prior to the fly ash being received inside said heating chamber.

4. The apparatus as described in claim 3 wherein said heating chamber is disposed next to said preheating chamber for preheating untreated fly ash as it is received through said preheating chamber.

5. The apparatus as described in claim 3 further including heating elements used during the start up of the apparatus and connected to said preheating chamber and said heating chamber for heating said chambers prior to introducing the fly ash into said preheating chamber and said heating chamber.

6. An apparatus for removing unburned carbon in fly ash, the apparatus comprising:

a preheating chamber for preheating untreated fly ash in a range of 800 degrees F.;

preheating chamber conveyor means mounted inside said preheating chamber for conveying the untreated fly ash along a length of said preheating chamber;

a heating chamber connected to said preheating chamber for receiving the preheated fly ash therefrom, said heating chamber heating the fly ash in a range from 800 to 1200 degrees F.;

heating chamber conveyor means mounted inside said heating chamber for conveying the fly ash to be treated along a length of said heating chamber;

an oxygen supply connected to said heating chamber for introducing oxygen at spaced apart locations along the length of said heating chamber; and computer control means connected to said oxygen supply and said heating chamber for regulating the temperature in said heating chamber and the heating of the fly ash.

7. The apparatus as described in claim 6 wherein said preheating chamber conveyor means and said heating chamber conveyor means are screw augers connected to and under the control of said computer control means.

8. The apparatus as described in claim 6 wherein said oxygen supply is connected to manifolds introduced at a bottom of said heating chamber and along heating areas at spaced apart locations along the length of said heating chamber.

9. A process for removing unburned carbon in fly ash in an apparatus having a heating chamber with screw auger for feeding the fly ash through the heating chamber, the process steps comprising:

introducing untreated fly ash at one end of the heating chamber;

conveying the fly ash along a length of the heating chamber;

heating the heating chamber with oxygen and in turn heating the fly ash in a range from 800 to 1200 degrees F.;

igniting unburned carbon in the fly ash as the fly ash is conveyed along the length of the heating chamber; and cooling the fly ash in a cooling chamber after the fly ash exits an opposite end of heating chamber.

10. The process as described in claim 9 wherein the heating of the heating chamber is done by introducing oxygen at spaced apart heating areas along the length of the heating chamber.

11. The process as described in claim 9 further including the step of preheating the untreated fly ash prior to the fly ash being introduced in one end of the heating chamber.

12. The process as described in claim 9 further including the step of preheating the untreated fly ash using a preheating chamber attached to the heating chamber prior to the fly ash being introduced in one end of the heating chamber.

13. The process as described in claim 9 further including the step of preheating the untreated fly ash using treated fly ash as a heat transfer agent after the treated fly ash has exited the heating chamber.

14. The process as described in claim 9 wherein the step of heating the heating chamber and in turn heating the fly ash in a range from 800 to 1200 degrees F. is under computer control for governing the temperature in the heating chamber and in turn regulating the burning of the unwanted carbon in the fly ash, the burning of the carbon acting as a fuel in combination with the oxygen for heating the fly ash and removing the remaining unburned carbon from the fly ash.

* * * * *